3,538,219
SUBSTANCES CONTAINED IN THE SEEDS OF ANNATTO AND IN THE KERNELS OF THE SEEDS OF SECUA, COOPERATE IN AN UNKNOWN FASHION IN THE PRODUCTION OF STABLE PHARMACOLOGICALLY ACTIVE COMPOSITIONS
Rose Dalmau Paret, 651 W. 171st St. N.,
New York, N.Y. 10032
No Drawing. Filed July 25, 1966, Ser. No. 567,783
Int. Cl. A61k 27/00
U.S. Cl. 424—195                          2 Claims

ABSTRACT OF THE DISCLOSURE

Preparations from the kernels of the seeds of secua (*Fevillea cordifolia*, L.), a climbing plant from the forests of tropical America, have been known for centuries, preconized as possessing valuable therapeutic properties, and prescribed against various disease conditions, some of which are known to be infectious in character.

---

The drawbacks preventing the use of the plant material in pharmaceutical products, have been:

(a) the instability of any preparation made from the seeds of secua;
(b) the unusual instability of the kernels from the seeds themselves; (the kernels from the seed must be used promptly after maturity, for they decompose rapidly, and in a relatively short time, disappear completely from the shell containing them, leaving either a small amount of brown dust, or a dark stain inside the shell.)
(c) the instability of the oil extracted from the kernel; (the kernel contains from 43 to 65 percent of oil, which is solid at room temperature. This oil, reported to be therapeutically useful in topical applications for the treatment of rheumatic affections, must be used for this purpose when freshly extracted. While fresh, the oil is white and odorless; however, it oxidize rapidly, and acquires a disagreeable odor). Extending with boiling water, either or with other solvents, the oil keeps in good condition for a long time. Treated this way, the oil has found use in industry; it is also used for illumination. However, the therapeutic properties claimed for the freshly extracted oil, are reportedly lost when extracted in the manner described above.
(d) although several compounds have been isolated from the seeds of secua since the advent of organic chemistry, none of these have proved to be the eagerly sought "alexeteric principle"—that is, the agent capable of effectively combatting infection and poison.

For the above mentioned reasons, the therapeutical uses of the seeds of secua have been confined to the popular medicine of those regions where the plant producing them grows.

For oral administration, a tincture or an emulsion from the kernels are the preparations recommended. The method of preparation for both the tincture and the emulsion is the same all over tropical America, and calls for crushing the kernels, mixing them of a good quality rum or brandy—diluted with water in the case of the emulsion—and exposing the mixture to the rays of the sun for a period of three or four days.

The process, as described, results in effective preparations. In all probability, the action of radiant energy has something to do with the effectiveness; however, the process does not confer stability to the preparation.

It is to be noted that the reported therapeutic claims for the preparations from the seeds of secua, as described above, have never been refuted. As previously stated, the problem has been that of instability.

This problem has been solved at least by the discovery of the invention.

Like the seeds of secua, the seeds of annatto, (*Bixa orellana*, L.) a tree which originated in tropical America, but which has extended to the tropical regions all over the world), have enjoyed a reputation for therapeutical usefulness. At the present time, however, the annatto seeds apparently are employed in this country mostly for other than medicinal purposes.

The interest of modern science has centered mainly on bixin, invariably described as the main pigment from the pulp covering the seeds of annatto.

As a coloring agent for cheese, butter, margarine and other foodstuffs, and as a pro-vitamin A. Polyene, bixin has found extensive use in commerce and industry; also in certain pharmaceutical preparations.

As a matter of fact, a number of patents having to do with the above mentioned uses for bixin, have been recently granted, both in this country and in Europe.

The instability of the pigments from the pulp of the annatto seed in solutions is well known, and has been extensively dealt with in recent literature.

Of the water soluble pigments and other compounds contained in the seeds of annatto, not much is known, except that they exist, and that one of the water soluble pigments, known for a long time and described as being of lesser importance when compared with bixin, has been termed "orellin."

It is to be noted that the present endeavor *is not* concerned with the utilization of bixin per se, but with the use of the whole seed of annatto, including the dry pulp surrounding same. To this effect, the effort is directed toward (a) the utilization of *substances contained* in the pulp and in the kernel of the seed of annatto, and which are soluble in water; in hydro-alcoholic solutions; in saline solutions; in any other suitable solvent medium; also concerned with
(b) the utilization of *substances formed* during the time the seeds of annatto are exposed to the action of the above mentioned solvents.

*Reason.*—A study of the methods followed in popular or indigenous medicine for the preparation of the seeds of annatto, when destined to medicinal uses, has brought to light the fact that the whole seed has been utilized; also that at times, the preparations of the material call for "fermentation."

Although no definite objective has been indicated, it is logical to assume that there must exist a special reason for a procedure which differs from that followed in the production of the annatto paste or "cake" known as "orleans" or "pate de roucous," and which is sold in the local markets in Latin America, or exported for commercial and industrial uses.

As far as annatto is concerned, what was called fermentation at the beginning of the centry, could probably be one of the processes referred to today as "proteolytic hydrolysis," "spontaneous isomerization," or "enzyme catalyzed transfer reactions."

As previously stated, the first discovery of the invention clearly demonstrated that a solution of annatto, as processed, has conferred stability to a hydro-alcoholic extract from the seeds of secua.

Further experiments have brought to light the fact that when a preparation from the seeds of annatto, processed as described below is mixed with the composition which gave rise to the basic discovery of the invention—in various proportions—crystal clear, stable compositions are also obtained.

For the process which has produced the results above referred to and which will be specified in the form of examples later on, your petitioner prays that Letters Patent be also granted to her. The annatto composition is identified as Example V.

This discovery, in addition to other facts described below, have led to the conclusion that the seeds of annatto and the seeds of secua, as processed by your petitioner, may work synergistically.

*Fevillea cordifolia*, L., the plant producing the seeds of secua, belong to the family of cucurbitaceae; *Bixa orellana*, L., which produces the seeds of annatto, belongs to the bixaceae. However, a parallelism between secua and annatto was noticed early in the course of the research relative to the present work and leading to the discovery:

A study of the recorded history of the medicinal uses given to annatto in the past, has elicited the observation that many of the therapeutic properties claimed for the seeds of annatto coincide with the therapeutic properties claimed for the seeds of secua. In addition, both plant materials have been preconized as possessing antidotal properties against violent organic poisons.

A process which requires more annatto and less secua to produce stable and useful compositions, may be considered advantageous, for the following reasons:

The seeds of secua are difficult to obtain, relatively expensive when obtainable, and above all, unstable. The seeds of annatto are easily procurable, will last for years in good condition, and are inexpensive.

Other advantages of the invention will become apparent upon consideration of the examples which follow.

To illustrate how the invention works, I will give a few examples, without, however, limiting it thereto:

Following is the description of the methods for the preparation of an emulsion and a "tincture" from the seeds of secua, made by your petitioner late in 1959, according to the directions given in the literature: (Please refer to Dr. R. de Grosourdy's "El Medico Botanico Criollo," vol. II, pp. 37 and 721).

EXAMPLE I

The emulsion

Six kernels from the seeds of secua were crushed with mortar and pestle, mixed with a solution consisting of 0.5 liter of a good quality rum, and 0.5 liter of distilled water. The preparation was exposed to direct sunlight for three days. During this time, the flask containing the preparation was stirred occasionally. At the end of this period, the preparation was filtered, bottled, capped tightly, and stored away from any direct light.

The appearance of the filtrate was crystal clear, and it had a very pale yellow color.

EXAMPLE II

The "tincture"

Processed at the same time, the method followed for the preparation of the "tincture" was the same as for the emulsion, but a liter of rum was used for the mixture instead of half a liter of rum and half a liter of water. The resulting liquor was strained through cloth instead of filtering.

Made for personal use, both preparations were tried, and found to be effective for the purpose intended. Several weeks later, however, discolorations were observed, and these became more noticeable as time went on. Before a year had passed, the color of both preparations had changed to a dark brown.

No more seeds were available until 1962, in February. The first discovery of the invention happened at this time, and may be described as follows:

A SOLUTION OF ANNATTO SEEDS CONFERS STABILITY TO AN EXTRACT FROM THE KERNELS OF THE SEEDS OF SECUA.

The process is defined hereinafter as

EXAMPLE III

Thus, 55 grams of kernels from the seeds of secua, were first crushed with mortar and pestle, and then mixed with a 50:50 solution of a good quality rum and distilled water to make 1 liter. The mixture was homogenized in a Waring blender, placed in a glass flask, and exposed to direct sunlight during the day and kept in darkness during the night, for a period of 96 hours.

48 hours after the secua preparation was started, 5 grams of whole, dry annatto seeds were steeped in 250 ml. of distilled water, and allowed to stand in a dark place for 48 hours. At the end of this period, the annatto solution was strained through cloth, and the resultant liquor was mixed with the secua preparation.

The secua-annatto composition was kept away from direct light this time, and allowed to stand for 72 hours, after which the composition was filtered, bottled, capped tightly, and stored away.

This composition remained crystal clear, pleasantly scented and with no observable sign of alteration or discoloration for over two years, demonstrating thus, that stability for the preparation had been attained.

The second phase of the invention came about in May 1965, when a few more seeds from secua were obtained.

The process is defined hereinafter as

EXAMPLE IV

Thus, an extract from the seeds of secua and annatto was processed according to the method described as Example III.

This time, however, an objective thought was directed to the residual fraction of the preparation, from which the upper layer—Example III—had been separated. The object was the preservation and utilization of this residual fraction.

To this effect, a small portion of the upper phase of the composition, and which constitutes the hydroalcoholic extract, was left in the flask with the lower phase; the preparation was transferred to a smaller flask, capped tightly, and stored away.

Months later, it was realized that the stabilization of this phase of the preparation had also been attained.

It is to be noted that no mention of any use whatever for this residual fraction has been found in the available literature concerning the seeds of secua. In all probability, the residual fraction has been discarded after the preparation of the extract or of the emulsion.

The stability of this composition may be considered an important achievement, for the following reasons:

(1) The preservation of the residual fraction, which comprises those substances which are insoluble in water or in alcohol, makes possible their utilization long after the same substances—if present as such—in the kernels of the seeds of secua, would be serviceable, due to the instability of the material, as previously stated.

(2) The seeds of oil yielding plants are known to contain certain comopunds (globulins) which are insoluble in water or in alcohol, but soluble in weak saline solutions.

The globulins from the seeds of cucurbitaceae have been found to be closely allied, in most properties; however, they are also known to be distinct from each other in amino-acid composition. Some globulins from cucurbitaceae have been found to be physiologically active.

(3) The residual fraction from the secua-annatto composition, obviously contains substances which not being soluble in water or in alcohol, have remained undisolved. This residual fraction, then, should contain the globulins from the kernels of the seeds of secua. However, because the material has been exposed to the action of the radiant energy of the sun as well as to the influence of the solvent and of other physiologically active materials, it is to be expected that new compounds have been formed during the process of preparation.

(4) Whether known or unknown, these compounds have been created by a novel process.

(5) The stability of the composition defined as Example IV adds significance to this phase of the invention, upon consideration of the fact that the composition is ready to be employed as and when needed, whereas the natural material from which it has been produced, may not be available.

Another objective of the invention: Extension of the utilization of the compositions characterized as Example III and Example IV.

This has also been attained, by combining these preparations with a composition from the seeds of annatto, effected by a novel method, for which your petitioner prays and Letters Patents may be granted to her.

This invention relates to a process for the production of a stable hydroalcoholic extract from the seeds of annatto, (*Bixa orellana*, L.). The process, described below, will be defined hereinafter as

EXAMPLE X

*Step 1.*—10 grams of dry annatto seeds, steeped in 800 ml. distilled water, and allowed to stand in darkness for 120 hours.

*Step 2.*—Resulting liquor is filtered at the end of this period, and stored away.

*Step 3.*—Residue, which comprises the annatto seeds, (still whole, but swollen, showing the effects of water penetration), is mixed with 200 ml. of a high quality run, for 72 hours. At the end of this period, the extract is strained though cloth, and added to the aqueous annatto extract.

*Step 4.*—The composition is filtered 72 hours later, bottled, and heated in a water bath at 180°, for 1½ hours. At the end of this period, the composition is allowed to cool off, capped tightly, and stored away.

This composition remains stable, has a crystal clear appearance, is pleasantly scented, and constitutes a useful product either by itself or in combination with other pharmaceutically acceptable materials.

The usefulness of the composition defined as Example V will become apparent upon consideration that it comprises the best known way of administration of a provitamin A carotenoid: "in aqueous dispersions, together with its own natural carrier materials." Please refer for this statement to the Annual Review of Biochemistry, 1961, p. 448.

Vitamin A, known as the anti-infection vitamin, may be one of the factors contributing to the usefulness of the new preparations with which my work is concerned.

As previously stated, the extension of the utilization of the compositions characterized as Example III and Example IV, has been attained, by the combination of these preparations with the composition characterized as Example V, in a process defined hereinafter as

EXAMPLE VI 4 parts of the preparation defined as Example III;
1 part of the preparation defined as Example IV;
5 parts of the preparation defined as Example V.

The three preparations are mixed, allowed to stand for 144 hours away from direct light, stirred gently occasionally. At the end of this period, the new composition is filtered, bottled, and capped tightly.

This composition is a crystal clear, pale yellow, pleasantly scented product, which remains stable at room temperature, with only the protection of amber colored containers.

It has been found that the proportion of the third mentioned constituent of the new composition can be increased, without affecting the stability of the product.

The reasons why run has been employed—either alone or in combination with water—as the solvent medium, are stated herein, as follows:

(a) Rum has been used in past practice, and found to be an effective solvent medium;
(b) It contains two esters—ethylic butyrate and ethylic acetate. These esters contribute to the solubility of the unsaturated fatty acids which constitute the main constituent of the kernels of secua;
(c) The esters contained in the solvent medium may be either responsible for or contributing factors to the pleasant scent of the preparations.

Brandy has also been effectively used in past practice. Quite probably, the nature of the solvent has a decided influence upon the therapeutic properties of the secua preparations. A combination of rectified spirits of wine or ethanol, ethylic butyrate ethylic acetate in equivalent proportions as contained in a good quality rum, may likewise produce stable preparations. However, only comparative tests may determine whether the therapeutic results obtained ae equally effective.

Having now particularly described the nature of the inventions by way of examples, what I claim is:

1. A method of preparing an aqueous-alcoholic extract from annatto seeds and secua seeds, this method comprising crushing kernels from the seeds of secua, mixing the crushed kernels with about a 50:50 solution of distilled water and either brandy or rum, homogenizing the mixture, exposing the homogenized mixture successively to sunlight during the day and darkness during the night for about 96 hours, separately steeping annatto seeds in distilled water in relative weight proportions of about 1:50 based on annatto-water, permitting the annatto seeds-water admixture to stand in the dark for about 48 hours, straining to remove the annatto seeds and obtain an annatto extract, admixing said annatto extract with said exposed homogenized mixture, storing the resulting secua-annatto solution away from the direct light for about 72 hours, and filtering said solution to obtain an aqueous-alcoholic extract, 2. The extracts obtained by the method of claim 1.

References Cited

UNITED STATES PATENTS 3,066,074  11/1962  Hartgerink _____ 424—195

OTHER REFERENCES

Hocking, "Dictionary of Pharmacognosy," 1955, p. 84.
Steinmetz, "Codex Vegetabilis," 1957, entry No. 196.
Merck Index, 7th ed., 1960, p. 451.

STANLEY J. FRIEDMAN, Primary Examiner